United States Patent

[11] 3,615,391

[72] Inventors: Satoru Honjo; Seiji Matsumoto; Yasuo Tamai, all of Asaka-cho, Kita-Adachigun, Japan
[21] Appl. No.: 726,380
[22] Filed: May 3, 1968
[45] Patented: Oct. 26, 1971
[73] Assignee: Fuji Photo Film Co., Ltd. Kanagawa, Japan
[32] Priority: May 30, 1967
[33] Japan
[31] 45723/67

[54] ELECTROPHOTOGRAPHIC COLOR DEVELOPING METHOD
8 Claims, 2 Drawing Figs.

[52] U.S. Cl. ............................................................. 96/1.2, 96/9
[51] Int. Cl. ...................................................... G03g 13/22
[50] Field of Search ............................................. 96/1.2, 9

[56] References Cited
UNITED STATES PATENTS
3,043,686  7/1962  Bickmore .................... 96/1.2
3,057,720  10/1962  Heyford et al. ............. 96/1.2

Primary Examiner—George F. Lesmes
Assistant Examiner—John C. Cooper, III
Attorney—Sughrue, Rothwell, Mion, Zinn & Macpeak ABSTRACT: An electrophotographic developing method for compensating an unwanted spectroabsorption in coloring agent wherein an electrostatic latent image in a color spectrum, and a second electrostatic latent image in another color spectrum corresponding to the unwanted absorption of the first electrostatic latent image are in opposition with a narrow gap in between. A coloring agent corresponding to the first latent image is fed into the gap and the amount of color agent selectively attached to the first electrostatic latent image is controlled by the second electrostatic latent image.

PATENTED OCT 26 1971      3,615,391

INVENTORS.
SATORU HONJO
SEIJI MATSUMOTO
YASUO TAMAI

BY *Sughrue, Rothwell, Mion, Zinn & Macpeak*

ATTORNEYS.

ELECTROPHOTOGRAPHIC COLOR DEVELOPING METHOD

BACKGROUND OF THE INVENTION

1. Field of the Invention

This invention relates to an electrophotographic developing method which compensates for insufficient spectroabsorptive character of a color agent for forming an electrophotographic image, and which is highly suitable for color correction.

2. Discussion of Prior Art

One of the practical methods for obtaining an electrophotographic multicolor print is a method called "subtractive color process," under which a colored image is obtained by distributing three types of coloring agents which absorb blue, green and red components of visible light, respectively, in quantities corresponding to an electrostatic latent image. Under this subtractive color process, three types of coloring agents, that is, yellow to absorb blue, magenta to absorb green and cyan to absorb red are applied. Available magenta and cyan coloring agents such as printing ink, pigment and dyestuff always exhibit an unwanted absorption at the spectral region other than green or red, respectively. Generally, many magenta coloring agents absorb blue light to some degree, and red to a much lesser extent, while many cyan coloring agents absorb green light to a considerable degree, and blue light to a much lesser extent. Among the yellow coloring agents, there are some that are nearly ideal. Accordingly, to compensate for the unwanted absorption of a cyan coloring agent, at the area in an image where the cyan and the magenta coloring agent are superimposed, one may reduce the amount of magenta coloring agent to a degree proportional to the amount of the cyan coloring agent. Such control of each primary color image density by another primary color image density is remarkably effective in improving the color quality of the final multicolor print, and is generally called "color correction by masking." On the other hand, as a cyan coloring agent absorbs blue portion too, a yellow coloring agent may be similarly reduced, if so required, according to the quantity of cyan coloring agent in an image. In an entirely similar manner, the unwanted absorption of magenta coloring agent may be compensated for. However, under the conventional and practical methods of obtaining a multicolor print by an electrophotographic process, it has been difficult to make such compensation and the maintenance of color balance has been impossible.

SUMMARY OF THE INVENTION

In accordance with the present invention, there is provided a method for developing an electrostatic latent image which can be used for constant control or to realize a particular effect on the developed image. The method is characterized by oppositely facing a first electrostatic latent image and a second electrostatic latent image, across a narrow gap, and to control the electric field in the gap while feeding an electrophotographic developer containing a color agent into said gap.

DESCRIPTION OF PREFERRED EMBODIMENT

Figure 1:
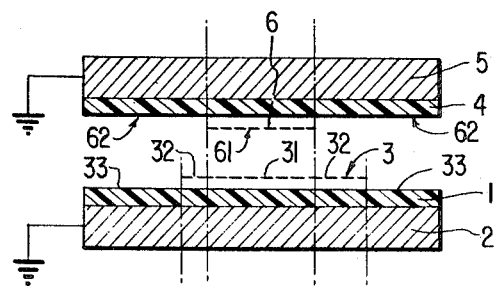
FIG. 1 is a schematic side elevation of the basic elements of a multicolor electrophotographic developing apparatus employing the method of the present invention.

The present invention is directed to a developing method characterized by a first electrostatic latent image to be developed, which is formed on an insulating recording layer provided on a conductive backing and is placed opposite to and a small distance apart from, another or second electrostatic latent image. The second electrostatic latent image may comprise any pattern, like a regular dot image, or an image which compensates for the unwanted absorption of a colored toner employed to develop the first latent image. A typical example of the present invention for the purpose of color masking will be given below.

A cyan image is assumed as already developed on an electrophotographic recording layer, which corresponds to a light image being exposed to said layer through a multicolor positive transparency and a red filter. The cyan image exhibits an unwanted absorption in the green region of the spectrum. Now this developed cyan image may be transferred to another receiving sheet or remain on the recording layer. For the purpose of simplicity, the cyan image is assumed to be transferred on an image receiving sheet. As the next operation, a magenta image is produced, whereby the color correction will be made according to the present invention. A charged electrophotographic recording member is subjected to an image exposure utilizing the same positive transparency and a green filter, whereby an electrostatic latent image is formed on the member. To accomplish color correction compensation for the unwanted absorption of green light by the cyan image, a second electrostatic recording member is charged and exposed to the same color transparency superposed with a red filter in such a manner that the second image becomes the mirror image relative to the first image. The resulting second latent image corresponds to that of the cyan image. This latent image bearing member is placed close to the first recording member in register therewith, and then the magenta toner is fed between the two members. It will be clear that the amount of toner, which deposits on the first latent image, is controlled or influenced by the second image, producing the desirable color correction when the polarity of these two latent images is the same. The present invention relates to a developing process characterized in that, in the multicolor electrophotography, a color-separated electrostatic latent image is placed opposite to and at a certain distance from another color-separated electrostatic latent image and developed by means of a coloring agent corresponding to the color-separated electrostatic latent image to be developed. This is repeated to obtain a multicolor electrophotography.

The principle of the present invention is described in more detail by reference to the drawing. An electrophotographic light sensitive layer 1 is provided with a conductive supporting material 2 on its reverse side. An electrostatic latent image 3 is formed on the electrophotographic light sensitive layer, which is assumed to have negative polarity in this drawing, comprising charged areas 31, 32 and a noncharged area 33. An insulative material 4 is provided with a conductive back material 5, which bears a second electrostatic latent image 6 which is the same in polarity as the first electrostatic latent image 3. Image 6 comprises charged area 61 and a discharged or noncharged area 62. The electrophotographic layer 1 and the insulative material 4 are facing each other with a small space or gap between them. If, with this arrangement, the electrostatic latent image 3 on the electrophotographic layer 1 is developed using a positively charged coloring matter, the coloring matter sticks satisfactorily to the area designated 32 on the electrophotographic layer 1 not facing the charged area 61 of the second electrostatic image, while, at the area 31 facing the charged area 61 of the second image, a decreased amount of the coloring agent deposits due to the electrostatic field strength being influenced by the second image. In this way, by controlling the electric field of the electrostatic latent image 3 on the electrophotographic layer 1 by means of the second electrostatic latent image 6 on the insulative layer 4, it is possible to control the quantity of coloring matter sticking to the electrostatic latent image 3, bringing about a so-called "masking effect" with a particular combination of images. If, utilizing this developing process, the electrostatic latent image 3 is formed on the electrophotosensitive layer 1 by means of radiation of light falling within a certain wavelength range, obtainable by color-separation of a color image to be reproduced and the second latent image 6 formed by radiation of light falling within another wavelength range, obtainable by color-separation, is placed opposite thereto so that both electrostatic latent images 3 and 6 correspond in register, and the electrostatic latent image 3 is developed with a coloring agent absorbing the first wavelength range, then color correction may be accomplished for any unwanted absorption, by the coloring matter mainly absorbing the second wavelength region. As was described above, if the first latent image corresponds to the magenta component of the final multicolor image, and the second to the cyan component, then color correction compensating the unwanted absorption by the cyan coloring agent can be realized. A developing material of magenta color should be employed in this combination.

For instance, the electrophotosensitive layer 1 provided with the conductive supporting material 2 on the back is charged uniformly by a known method such as corona discharge, etc., the color image to be reproduced is separated into three colors, which are exposed onto the electrophotosensitive layer 1, and the electrostatic latent image 3 is formed. In the case of this exposure, black-and white images, each corresponding to a primary color image of a multicolor image to be reproduced may be used as an original, or rays of light passing through a color transparency bound to color-separation filters may be used. In a quite similar manner, a second electrostatic latent image 6 of the same polarity, to control the electric field on the first latent image, is formed on the insulative material 4. If a cyan coloring agent is supplied between the electrophotosensitive layer 1 and the insulative material 4 under such conditions, the coloring agent sticks to the electrostatic latent image 3 in a quantity proportional to the intensity of its electric field. Accordingly, in the area 61 where the charged area 31 of the first latent image 3 and the charged area 61 of the second image 6 face each other, an electric field, proportional to the potential difference between both electrostatic latent images, is produced and the deposited amount of cyan coloring agent may be reduced. The electrostatic latent image 3 is converted to a magenta visible image in which the unwanted absorption at the green region of the spectrum of the cyan coloring agent is compensated for. Similarly, if the electrostatic latent image 3 comprising the yellow component of the same color image is formed on the electrophotosensitive layer 1, the second electric field controlling latent image 6 comprising the magenta component is formed on the insulative material 4. The electrostatic latent image 3 is developed with a yellow coloring agent and an image of yellow coloring agent in which the effect of the unwanted absorption of blue light by the magenta coloring agent is substantially cancelled. The development of cyan component is carried out under the ordinary electrophotographic process, because generally, many yellow and magenta coloring agents exhibit only very weak absorption at the red region of the spectrum. These images of coloring agents in different colors may be formed by superimposition on the same electrophotosensitive layer or they may be developed per color and transferred by superimposition in register onto the surface of another material.

For the purpose of simplicity, the electrostatic charge density of the charged area 31 and 61 in the two electrostatic latent images 3 and 6 is expressed as equal in the attached drawing. Practically the charge density of the field controlling image should be far lower than that of image to be developed, depending on the degree of the unwanted absorption of the coloring agent.

As described above in detail, the present invention provides a method of developing a multicolor print which can achieve color compensation at the areas where the images formed by coloring agents overlap each other. As color balance generally appears conspicuous in a mixed color portion, fully satisfactory electrophotographic multicolor prints can be obtained by color compensation of a mixed color portion according to the developing process of the present invention. For instance, a cyan coloring agent image formed solely by cyan coloring agent which absorbs not only red, but also considerable green, appears to human eyes as a nearly perfect cyan color requiring no further color correction, but the area where cyan and magenta coloring matters overlap each other, appears to be unbalanced due to excessive absorption of green. The same applies to the area where yellow is superposed on magenta. Accordingly, if color correction is made at a mixed color portion according to the method of the present invention, an electrophotographic multicolor image having improved color balance can be obtained.

Figure 2:
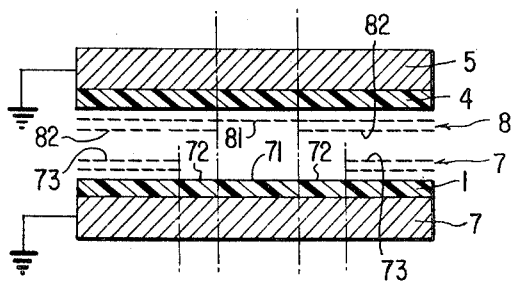
FIG. 2 is a schematic side elevation of another arrangement of a multicolor electrophotographic developing apparatus employing the method of the present invention.

In the meantime, in the case of reversal development, a color-separated electrostatic latent image, to be employed for the purpose of masking, acts as development electrode. In the case where the unwanted absorption of green light by a cyan coloring agent is to be compensated for at the step of magenta development, and where the image for each primary color are all optically negative, an electrostatic latent image corresponding to a negative magenta image is developed under the influence of a second latent image corresponding to a negative cyan image. The latter image should have a uniform background or bias potential therethrough as is shown in FIG. 2, in which a latent image to be developed is designated 7 and the masking image 8. The former image comprises a high potential area 73, and low or zero potential areas 71 and 72, the latter comprising a high potential area 82 and lower potential area 81. To carry out a reversal development, a developer, including a toner of the same polarity as the latent image to be developed, is fed between these two sheet materials, whereby the area 73 will not attract substantially any toner particles at all, and areas 71 and 72 will be developed. It should be noted that the deposited amount of toner will be heavier at the area 72 than at the area 71; due to the difference of the electric field strength thereon. Thus again the masking has been achieved at the area 71. If electrophotographic layers having the same characteristic are used for the formation of an electrostatic latent image to be developed and an electrostatic latent image for masking, the surface potentials of both electrostatic latent images attenuate at the same rate under various atmospheric conditions.

In conventional reversal development, a large voltage is applied to a conductive development electrode placed close to an electrostatic latent image. The voltage should be high enough to just nullify the field on the highest potential area in the latent image.

When a liquid developer is employed, the charge of the latent image sometimes exhibits a rapid attenuation during development, whereby a finited field strength will appear on the highest potential area in the latent image, resulting in toner deposition thereon. Such disadvantage is eliminated in the method of the present invention, because the bias potential will decrease at the same rate as the latent image potential, maintaining the preferred field strength throughout the image.

An electrostatic latent image to be developed and an electrostatic latent image for masking may be formed simultaneously on electrophotographic sheet materials by separating the light flux from an original image into two directions by means of a half mirror (not shown) and using suitable color-separation filters respectively, or electrostatic latent images may be formed from monochrome images obtained by color separation. Also, it goes without saying that in respect of an electrophotosensitive layer used to form an electrostatic latent image thereon, not only a photoconductive insulative layer, but also an insulative resin layer may be used to form an electrostatic latent image by scanning methods, etc.

What is claimed is:

1. In an electrophotographic subtractive color reproduction process wherein different colored images are superimposed to produce a final color print, the improvement which comprises compensating for unwanted absorption in a first wavelength range by a first coloring agent, said first coloring agent also desirably absorbing light within a second wavelength range, said first coloring agent being superimposed with a second coloring agent in a colored copy of a colored original, the steps comprising 1. forming on a first recording layer a first electrostatic latent image by radiation of said first layer with light falling within said first wavelength range;
2. forming sequentially or simultaneously with respect to step (1) on a second recording layer a second electrostatic latent image by radiation of said second layer with light falling within said second wavelength range, said second electrostatic latent image being of the same polarity as said first electrostatic latent image;
3. placing said first and second recording layers adjacent to one another in a substantially parallel relationship but slightly apart from one another so that said first and second electrostatic latent images are in register with one another;
4. developing said first electrostatic latent image by providing between said recording layers a second coloring agent which absorbs said first wavelength range
   whereby the amount of said second coloring agent deposited on said first electrostatic latent image is less than the amount that would be deposited if the second electrostatic latent image were not present so that when said first and second coloring agents are superimposed in said colored copy, any unwanted light absorbed by said first coloring agent in said first wavelength range is compensated by the reduced amount of light absorbed by said second coloring agent.

2. The method as in claim 1 including the additional steps which may be executed either before or after all of the steps of claim 7, said additional steps comprising
   forming said second electrostatic image on said first recording layer; and
   developing said second electrostatic image with said first coloring agent, said second recording member being removed from said first recording member so that any electrostatic field on said second recording member has no effect on said first recording member.

3. The method of claim 2 including the transfer of said first and second coloring agents to a receiving sheet.

4. The method as claimed in claim 1 wherein said first electrostatic latent image is formed on a photoconductive insulating layer provided with a conductive support and said electrostatic latent image is formed on an insulating layer provided on a conductive back and said method further includes electrically coupling said conductive support and said conductive backing to place them at the same electric potential.

5. The method that is claimed in claim 4 further comprising, forming said photoconductive insulating layer for said first latent image and said insulating layer for said second electrostatic latent image of the same material.

6. The method as claimed in claim 5 in which the insulated material comprises an intimate mixture of photoconductive zinc oxide and an insulating resinous binder.

7. The method as claimed in claim 1 for developing a magenta component of an electrophotographic multicolor print comprising: forming a magenta component electrostatic latent image as the first latent image, and forming a cyan component electrostatic latent image as the second latent image and feeding a magenta developer therebetween.

8. The method as claimed in claim 1 for developing a yellow component of an electrophotographic multicolor print comprising: forming a yellow electrostatic latent image as the first latent image and a magenta component electrostatic latent image as the second latent image and feeding a yellow developer therebetween.

* * * * *

UNITED STATES PATENT OFFICE
CERTIFICATE OF CORRECTION

Patent No. 3,615,391　　　　　　　　　Dated October 26, 1971

Inventor(s) Satoru Honjo et al.

It is certified that error appears in the above-identified patent and that said Letters Patent are hereby corrected as shown below:

On the cover sheet [32] "May 30, 1967" should read -- May 22, 1967 --.

Signed and sealed this 5th day of November 1974.

(SEAL)
Attest:

McCOY M. GIBSON JR.　　　　　　　　　C. MARSHALL DANN
Attesting Officer　　　　　　　　　　　Commissioner of Patents

UNITED STATES PATENT OFFICE
CERTIFICATE OF CORRECTION

Patent No. 3,615,391      Dated October 26, 1971

Inventor(s) Satoru Honjo et al.

It is certified that error appears in the above-identified patent and that said Letters Patent are hereby corrected as shown below:

On the Cover Sheet, items [32], [33], and [31] should read as follows:

-- Priority    May 22, 1967
               Japan
               32421 --.

This certificate supersedes Certificate of Correction issued November 5, 1974.

Signed and Sealed this

*twenty-sixth* Day of *August 1975*

[SEAL]

Attest:

RUTH C. MASON            C. MARSHALL DANN
*Attesting Officer*            *Commissioner of Patents and Trademarks*